US011277814B2

United States Patent
Karampatsis

(10) Patent No.: US 11,277,814 B2
(45) Date of Patent: Mar. 15, 2022

(54) METHODS AND APPARATUSES FOR PAGING A REMOTE UNIT WITH A DIRECT MOBILE CONNECTION

(71) Applicant: Motorola Mobility LLC, Chicago, IL (US)

(72) Inventor: Dimitrios Karampatsis, Ruislip (GB)

(73) Assignee: Motorola Mobility LLC, Chicago, IL (US)

( * ) Notice: Subject to any disclaimer, the term of this patent is extended or adjusted under 35 U.S.C. 154(b) by 57 days.

(21) Appl. No.: 16/625,554

(22) PCT Filed: Jun. 20, 2017

(86) PCT No.: PCT/EP2017/065026
§ 371 (c)(1),
(2) Date: Dec. 20, 2019

(87) PCT Pub. No.: WO2018/233809
PCT Pub. Date: Dec. 27, 2018

(65) Prior Publication Data
US 2020/0187152 A1 Jun. 11, 2020

(51) Int. Cl.
*H04W 68/00* (2009.01)
*H04W 76/10* (2018.01)
*H04W 4/06* (2009.01)

(52) U.S. Cl.
CPC .......... *H04W 68/005* (2013.01); *H04W 4/06* (2013.01); *H04W 76/10* (2018.02)

(58) Field of Classification Search
CPC ...... H04W 68/005; H04W 76/10; H04W 4/06
See application file for complete search history.

(56) References Cited

U.S. PATENT DOCUMENTS

2015/0215918 A1* 7/2015 Wu ................... H04W 72/0433
370/329

FOREIGN PATENT DOCUMENTS

| EP | 2833694 A2 | 2/2015 |
|----|-----------|--------|
| WO | 2017026760 A1 | 2/2017 |
| WO | 2017052103 A1 | 3/2017 |
| WO | 2017099837 A1 | 6/2017 |

OTHER PUBLICATIONS

PCT/EP2017/065026, "Notification of the International Search Report and the Written Opinion of the International Searching Authority, or the Declaration", PCT, dated Mar. 8, 2018, pp. 1-18.
(Continued)

*Primary Examiner* — Joshua L Schwartz
(74) *Attorney, Agent, or Firm* — Kunzler Bean & Adamson

(57) ABSTRACT

Apparatuses, methods, and systems are disclosed for paging a remote unit that has a direct mobile connection to a relay unit. One apparatus includes a processor, a first transceiver that communicates with a mobile network, and a second transceiver that communicates with a remote unit via a direct mobile connection. The processor transmits a multicast address to the remote unit via the direct mobile connection. The processor determines to page the remote unit based on signaling from the mobile network. The processor also transmits a paging message for the remote unit to the multicast address.

16 Claims, 9 Drawing Sheets

(56) References Cited

OTHER PUBLICATIONS

3GPP, "3rd Generation Partnership Project; Technical Specification Group Services and System Aspects; Proximity-based services (ProSe); Stage 2 (Release 15)", 3GPP TS 23.303 V15.0.0, Jun. 2017, pp. 1-130.

HTC, "Resolve FFS for IP Multicast on Relay", SA WG2 Meeting #108 S2-151033, Apr. 13-17, 2015, pp. 1-3.

3GPP, "3rd Generation Partnership Project; Technical Specification Group Services and System Aspects; Study on architecture enhancements to support Proximity-based Services (ProSe) (Release 12)", 3GPP TR 23.703 V12.0.0, Feb. 2014, pp. 1-324.

3GPP, "3rd Generation Partnership Project; Technical Specification Group Services and System Aspects; Study on Architecture Enhancements to ProSe UE-to-Network Relay (Release 15)", 3GPP TR 23.733 V15.0.0, Sep. 2017, pp. 1-81.

Nokia Networks, "Update of the solution using IP multicast in the UE-to-NW Relay", SA WG2 Meeting #108 S2-150990, Apr. 13-17, 2015, pp. 1-4.

3GPP, "3rd Generation Partnership Project; Technical Specification Group Radio Access Network; Study on further enhancements to LTE Device to Device (D2D), User Equipment (UE) to network relays for Internet of Things (IoT) and wearables; (Release 15)", 3GPP TR 36.746 V1.0.0, Jun. 2017, pp. 1-35.

* cited by examiner

METHODS AND APPARATUSES FOR PAGING A REMOTE UNIT WITH A DIRECT MOBILE CONNECTION

FIELD

The subject matter disclosed herein relates generally to wireless communications and more particularly relates to paging a remote unit that has a direct mobile connection to a relay unit.

BACKGROUND

The following abbreviations and acronyms are herewith defined, at least some of which are referred to within the following description.

Third Generation Partnership Project ("3GPP"), Data Radio Bearer ("DRB"), Device-to-Device ("D2D"), Discontinuous Reception ("DRX"), Downlink ("DL"), Downlink Control Information ("DCI"), Evolved Node B ("eNB"), European Telecommunications Standards Institute ("ETSI"), Frequency Division Duplex ("FDD"), Frequency Division Multiple Access ("FDMA"), Home Subscriber Server ("HSS"), Internet-of-Things ("IoT"), Internet Protocol ("IP"), Long Term Evolution ("LTE"), LTA Advanced ("LTE-A"), Medium Access Control ("MAC"), Multiple Access ("MA"), Mobility Management Entity ("MME"), Non-Access Stratum ("NAS"), Narrowband ("NB"), Next Generation Node B ("gNB"), Orthogonal Frequency Division Multiplexing ("OFDM"), Packet Data Convergence Protocol ("PDCP"), Packet Data Network ("PDN"), PDN Gateway ("P-GW"), Physical Resource Block ("PRB"), Radio Bearer ("RB"), Radio Resource Control ("RRC"), Receive ("RX"), Serving Gateway ("S-GW"), Stream Control Transmission Protocol ("SCTP"), System Information Block ("SIB"), Transport Block ("TB"), Transport Block Size ("TBS"), Transmission Control Protocol ("TCP"), Time-Division Duplex ("TDD"), Time Division Multiplex ("TDM"), Transmission and Reception Point ("TRP"), Transmission Time Interval ("TTI"), Transmit ("TX"), Uplink Control Information ("UCI"), User Datagram Protocol ("UDP"), User Entity/Equipment (Mobile Terminal) ("UE"), Uplink ("UL"), Universal Mobile Telecommunications System ("UMTS"), Vehicle-to-Vehicle ("V2V"), Vehicle-to-Everything ("V2X"), and Worldwide Interoperability for Microwave Access ("WiMAX").

In mobile communication networks, a remote UE may establish an indirect connection to the mobile network behind a relay UE. While maintaining the direct mobile connection to the relay UE, the remote UE may need to be paged by the mobile network. Because the remote UE connects to the mobile network through the relay UE, the remote UE may be out of coverage of an eNB and thus may be unable to be paged directly by the eNB. Although the relay UE may monitor paging occasions of the remote UE, this poses problems as the relay UE needs to know the IMSI and DRX cycles of the remote UE to calculate its paging occasions. Further, this places an additional burden on the relay UE which may be required to monitor multiple additional paging occasions.

BRIEF SUMMARY

Methods for paging a remote UE that has a direct mobile connection to a relay UE are disclosed. Apparatuses and systems also perform the functions of the methods. One method of a relay UE for paging a remote UE that has a direct mobile connection to a relay UE includes communicating with a mobile network, establishing a direct mobile connection with a remote unit (e.g., a remote UE), and transmitting a multicast address to the remote unit via the direct mobile connection. The method also includes determining to page the remote unit based on signaling from the mobile network and transmitting a paging message for the remote unit to the multicast address.

One method of a network communication node, such as an MME or similar, for paging a remote UE that has a direct mobile connection to a relay UE includes receiving a trigger to page a remote UE and identifying a relay UE that serves the remote UE. The method includes identifying a network communication node (e.g., MME) serving the relay UE. Here, the remote UE accesses the mobile network via sidelink communication with the relay UE. The method also includes sending a paging message to the network communication node serving the relay UE, the paging message containing a page for the remote UE.

Another method of a network communication node, such as an MME or similar, for paging a remote UE that has a direct mobile connection to a relay UE includes receiving a paging message for a remote UE and identifying a relay UE that serves the remote UE. Here, the remote UE accesses the mobile network via sidelink communication with the relay UE. The method also includes sending the paging message for the remote UE to the relay UE.

One system for paging a remote UE that has a direct mobile connection to a relay UE includes a relay unit (e.g., relay UE) that communicates with a mobile network, a remote unit (e.g., remote UE) that accesses the mobile network via a direct mobile connection with the relay unit, a first network communication node (e.g., MME) that manages mobility of the remote unit, and a second network communication node (e.g., MME) that manages mobility of the relay unit. Here, the first network communication node sends a paging message for the remote unit to the second network communication node, the second network communication node sends the paging message to the relay unit, and the relay unit multicasts the paging message to the remote unit using a preconfigured multicast address.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
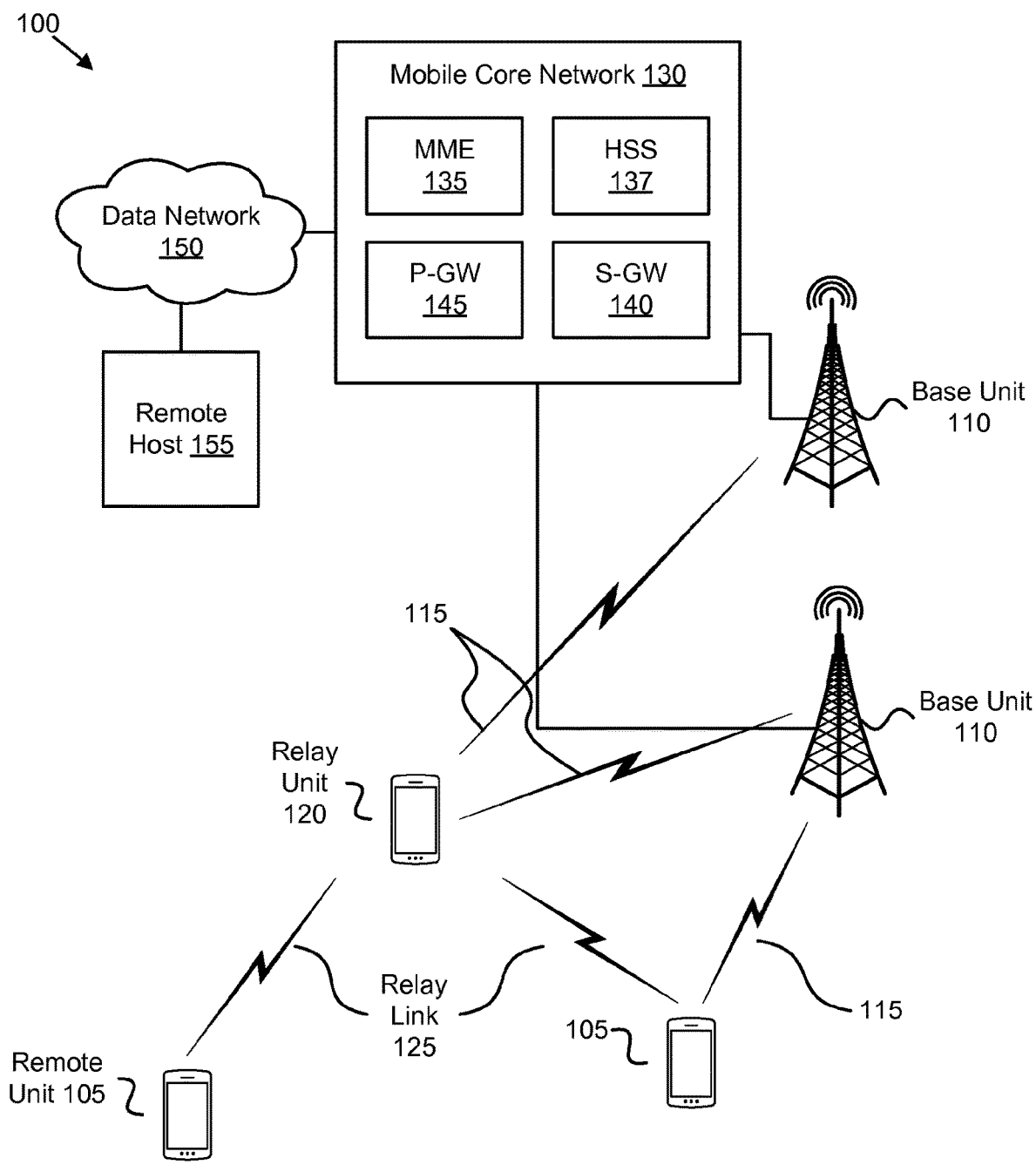
FIG. 1 is a schematic block diagram illustrating one embodiment of a wireless communication system for paging a remote UE that has a direct mobile connection to a relay UE.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/ acts specified in the schematic flowchart diagrams and/or schematic block diagram.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

The description of elements in each figure may refer to elements of proceeding figures. Like numbers refer to like elements in all figures, including alternate embodiments of like elements.

In order to provide for paging a remote UE that has a direct mobile connection to a relay UE without raising privacy concerns by providing the IMSI of the remote UE to a third party (e.g., the relay UE), systems, apparatus, and methods paging a remote UE that has a direct mobile connection to a relay UE are disclosed herein. When an MME receives a trigger to page the remote UE, the MME identifies the MME serving the relay UE and sends the paging message to the MME serving the relay UE. The MME serving the relay UE identifies that the paging message is intended for a Remote UE that has an indirect connection via the relay UE and sends the paging message to the relay UE. In one embodiment, the MME serving the relay UE sends the paging message within dedicated NAS signaling. In another embodiment, the MME serving the relay UE sends the paging message during the relay UE's paging occasion along with an indicator that the paging message is for the remote UE. Upon receiving the paging message, the relay UE identifies that the paging message is intended for a remote UE and multicasts the message over the direct mobile connection to all remote UE connected to the relay UE using a preconfigured multicast address.

FIG. 1 depicts a wireless communication system 100 for paging a remote UE that has a direct mobile connection to a relay UE, according to embodiments of the disclosure. In one embodiment, the wireless communication system 100 includes remote units 105, base units 110, and communication links 115. Even though a specific number of remote units 105, base units 110, and communication links 115 are depicted in FIG. 1, one of skill in the art will recognize that any number of remote units 105, base units 110, and communication links 115 may be included in the wireless communication system 100.

In one implementation, the wireless communication system 100 is compliant with the LTE system specified in the 3GPP specifications. More generally, however, the wireless communication system 100 may implement some other open or proprietary communication network, for example, WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as subscriber units, mobiles, mobile stations, users, terminals, mobile terminals, fixed terminals, subscriber stations, UE, remote UE, user terminals, a device, or by other terminology used in the art. The remote units 105 may communicate directly with one or more of the base units 110 via uplink ("UL") and downlink ("DL") communication signals. Furthermore, the UL and DL communication signals may be carried over the communication links 115.

The base units 110 may be distributed over a geographic region. In certain embodiments, a base unit 110 may also be referred to as an access terminal, a base, a base station, a Node-B, an eNB, a gNB, a Home Node-B, a relay node, a femtocell, an access point, a device, or by any other terminology used in the art. The base units 110 are generally part of a radio access network ("RAN") that may include one or more controllers communicably coupled to one or more corresponding base units 110. These and other elements of radio access network are not illustrated but are well known generally by those having ordinary skill in the art. The base units 110 connect to the mobile core network 130 via the RAN.

The base units 110 may serve a number of remote units 105 within a serving area, for example, a cell or a cell sector via a wireless communication link. The base units 110 may communicate directly with one or more of the remote units 105 via communication signals. Generally, the base units 110 transmit downlink ("DL") communication signals to serve the remote units 105 in the time, frequency, and/or spatial domain. Furthermore, the DL communication signals may be carried over the communication links 115. The communication links 115 may be any suitable carrier in licensed or unlicensed radio spectrum. The communication links 115 facilitate communication between one or more of the remote units 105 and/or one or more of the base units 110.

The wireless communication system 100 includes one or more relay units 120 capable of relaying traffic of the remote units 105 to the base units 110. The relay units 120 are remote units 105 capable of relaying the traffic. As such, a relay unit maintains its own network connections. Moreover, the relay unit 120 may be referred to as a "relay UE." In one embodiment, a relay unit 120 may communicate with a remote host 155 via a network connection with a base unit 110 and the mobile core network 130. The remote units 105 and relay units 120 communicate using relay links 125. In one embodiment, the relay links 125 may be any suitable carrier in licensed or unlicensed radio spectrum. Examples of relay links 125 include, but are not limited to LTE-direct links, WiFi-direct links, and the like. The relay links 125 may form a D2D connection, a V2V connection, a V2X connection, and the like.

In one embodiment, the mobile core network 130 is an evolved packet core ("EPC"), which may be coupled to a data network 150, like the Internet and private data networks, among other data networks. In some embodiments, the remote units 105 and/or relay units 120 communicate with a remote host 155 via a network connection with the mobile core network 130. Each mobile core network 130 belongs to a single public land mobile network ("PLMN"). The present disclosure is not intended to be limited to the implementation of any particular wireless communication system architecture or protocol.

The mobile core network 130 includes several network elements. As depicted, the mobile core network 130 includes at least one MME 135, at least one HSS 137, at least one S-GW 140, and at least one P-GW 145. Although a specific number of MMEs 135, HSSs 137, S-GWs 140, and P-GWs 145 are depicted in FIG. 1, one of skill in the art will recognize that any number of MMEs 135, HSSs 137, S-GWs 140, and P-GWs 145 may be included in the mobile core network 130.

Figure 2A:
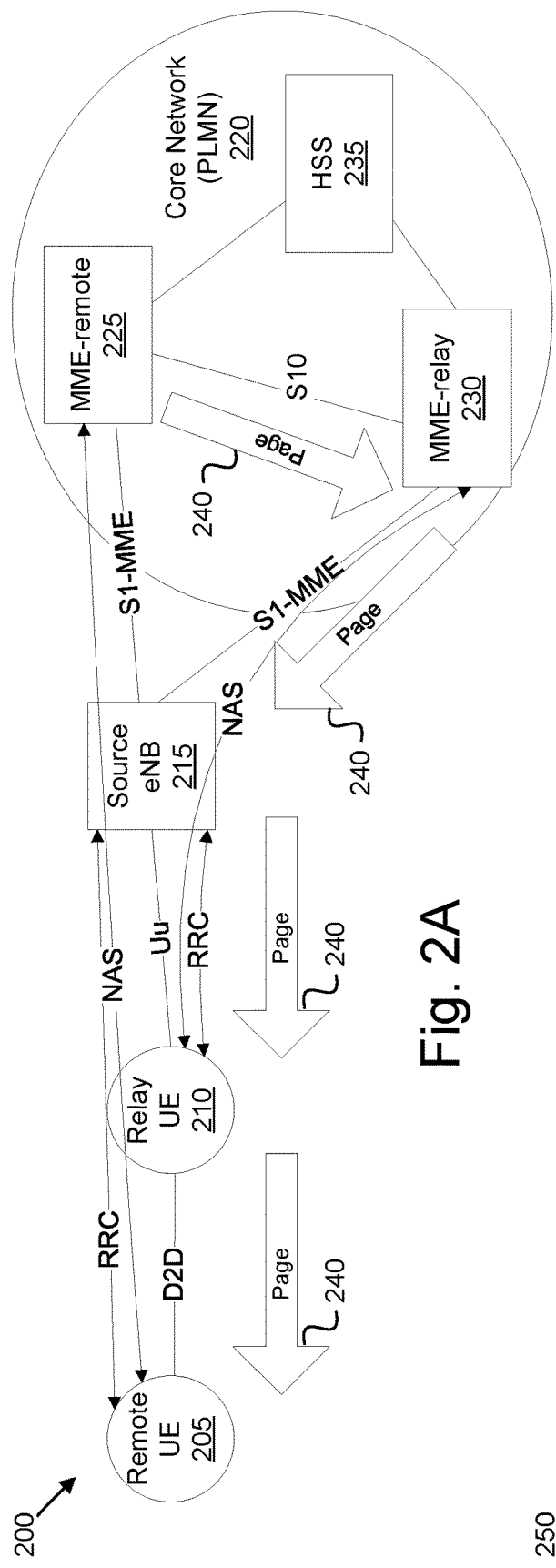
FIG. 2A is a block diagram illustrating one embodiment of a network architecture for paging a remote UE that has a direct mobile connection to a relay UE.

The MME 135 is a control plane network element that handles signaling related to mobility and security for the remote unit 105. The MME 135 is a termination point for a NAS connection of the remote unit 105 to the mobile core network 130. The HSS 137 is a control plane element that stores (and updates, when necessary) a database containing all the user subscription information, including user identification and addressing. The S-GW 140 is a user plane element that connects the RAN to the mobile core network 130. The S-GW 140 serves the remote unit 105 by routing incoming/outgoing IP packets. The P-GW 145 is a user plane element that connects the mobile core network 130 to an external (IP) network, such as the data network 150. Although logically separate elements, in some FIG. 2A depicts a network architecture 200 used for paging a remote UE that has a direct mobile connection to a relay UE, according to embodiments of the disclosure. The network architecture 200 may be a simplified embodiment of the wireless communication system 100. As depicted, the network architecture 200 includes a remote UE 205, a relay UE 210, an eNB 215, a core network 220, an MME serving the remote UE ("MME-remote") 225, an MME serving the relay UE ("MME-relay") 230, and a HSS 235. Here, the eNB 215 and core network 220 (including its components) are referred to as a "mobile network." Note that FIG. 2A also depicts a series of paging messages 240 traversing the mobile network when the MME-remote 225 pages the remote UE 205. In the depicted embodiments, the remote UE 205 has an indirect connection to the core network 220 via a direct mobile connection to the relay UE 210.

The remote UE 205 may be one embodiment of the remote unit 105. The relay UE 210 may be one embodiment of a remote unit 105 acting as a relay unit 120. Here, the remote UE 205 and the relay UE 210 have a direct mobile connection, such as a device-to-device ("D2D") connection. The remote UE 205 has its own subscription with the mobile network and, when accessing the mobile network via a relay UE 210, it utilizes its own subscription credentials. The relay UE 210 functions as a "layer-2" relay for the remote UE 205. Also, the remote UE 205 communicates with the mobile network (e.g., eNB 215 and core network 220) by using its own NAS signaling connection and RRC signaling connection with both connections going through the relay UE 210. While only one remote UE 205 is depicted, in other embodiments multiple remote UEs 205 may be associated with the relay UE 210 (e.g., may use the relay UE 210 as a L2 relay to the mobile network).

As depicted, the remote UE 205 has a NAS connection with the MME-remote 225 located in the core network 220. Here, the data path of the remote UE 205's NAS connection includes the relay UE 210 and the eNB 215. Also as depicted, the relay UE 210 has a separate RRC connection with the eNB 215 and a separate NAS connection with the MME-relay 230 from the RRC and NAS connections of the remote UE 205. The eNB 215 may be one embodiment of the base unit 110, the core network 220 may be one embodiment of the mobile core network 130, and the HSS 235 may be one embodiment of the HSS 137, discussed above with reference to FIG. 1. Further, each of the MME-remote 225 and MME-relay 230 may be an embodiment of the MME 135 described above with reference to FIG. 1.

As depicted in FIG. 2A, the eNB 215 serves the relay UE 210 and indirectly serves the remote UE 205. Here, the eNB 215 has a connection to the relay UE 210 (e.g., using a "Uu" interface), a connection to the MME-remote 225 (e.g., using a "S1-MME" interface), and a connection to the MME-relay 230 (e.g., also using a "S1-MME" interface). At some point, the MME-remote 225 receives a trigger to page the remote UE 205. Here, the MME-remote 225 is aware that the remote UE 205 has an indirect connection to the mobile network via the relay UE 210. Accordingly, the MME-remote 225 identifies the MME-relay 230 as the MME serving the relay UE 210 and sends a paging message 240 for the remote UE 205 to the MME-relay 230 (e.g., using a "S10" interface). In some embodiments, the paging message 240 includes an identity of the relay UE and an identify of the remote UE.

Upon receiving the page from the MME-remote 225, the MME-relay 230 identifies the relay UE 210 as having a direct connection with the remote UE 205. The MME-relay 230 then sends a paging message 240 to the eNB 215 which in turn transmits the paging message 240 to the relay UE 210 over the Uu interface. In some embodiments, the paging message 240 is encapsulated in a NAS message sent to the relay UE.

The relay UE determines that the paging message 240 is for the remote UE 205 and multicasts the paging message to the remote UE using a preconfigured multicast address. In one embodiment, the multicast address is a multicast group IP address. In another embodiment, the multicast address is a layer 2 group identifier. Here, the relay UE 210 configures the remote UE 205 with the multicast address. In one embodiment, the relay UE 210 receives the multicast address from a proximity service function via a PC3 interface (not shown).

The relay UE 210 differs from a traditional relay node is that it also operates as a normal UE that attaches to the mobile network and establishes its own RRC and NAS connections. As shown in FIG. 2A, both the remote UE 205 and the relay UE 210 have separate RRC connections and NAS connections with the mobile network. In certain embodiments, the MME selected to serve the remote UE 205 (here, the MME-remote 225) may be different from the MME selected to serve the relay UE 210 (here, the MME-relay 230). This is because the MME is selected based on subscription information and other criteria which may be different for the remote UE 205 and relay UE 210.

Figure 2B:
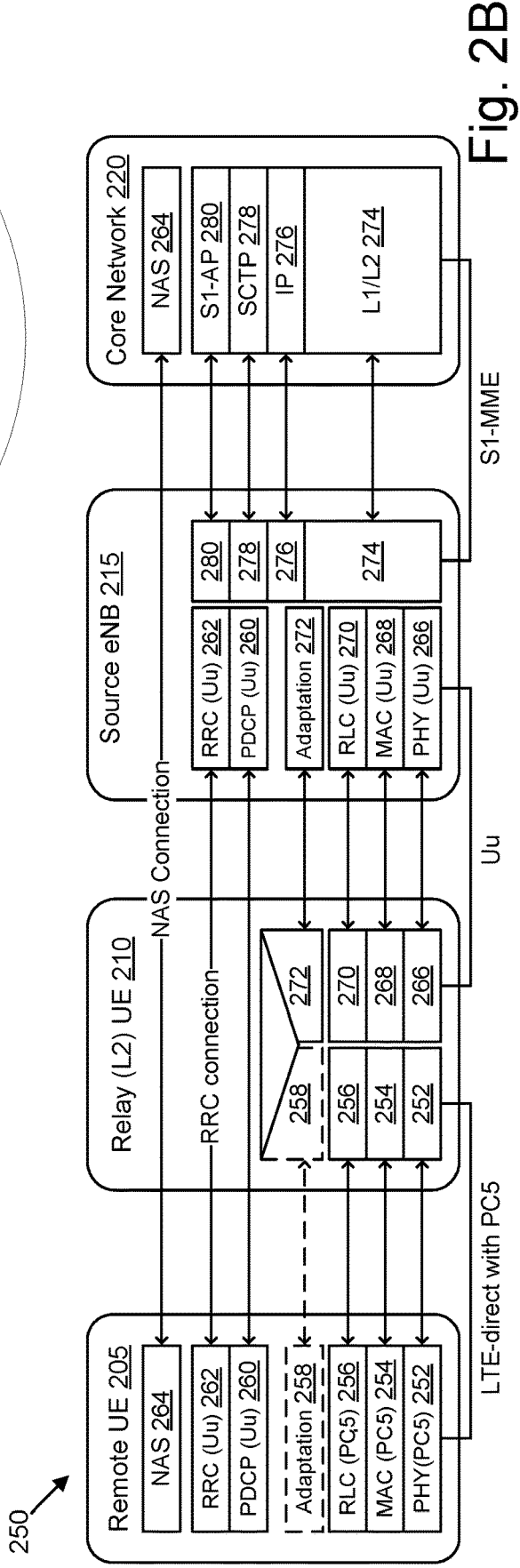
FIG. 2B is a block diagram illustrating one embodiment of a protocol stack by the network architecture of FIG. 2A.

FIG. 2B depicts a protocol stack 250 used in the network architecture 200. Specifically, FIG. 2B shows the protocol stack 250 used by the remote UE 205, relay UE 210, eNB 215, and core network 220. As discussed above, the remote UE 205 and relay UE 210 communicate using D2D technology, for example using an LTE-direct connection and PC5 signaling. While and LTE-direct/PC5 connection is shown in FIG. 2B, in other embodiments other D2D connection types may be employed between the remote UE 205 and the relay UE 210 that allow the relay UE 210 to act as an L2 relay, thereby rendering the remote UE 205 visible to the core network 220. Note that the remote UE 205 is visible to the mobile network (e.g., the eNB 215 and the core network 220) due to having RRC and NAS connections separate from those of the relay UE 210.

As depicted, the remote UE 205 has a PC5 physical layer 252 (depicted "PHY (PC5)"), a PC5 MAC layer 254 (depicted as "MAC (PC5)"), and a PC5 RLC layer 256 (depicted as "RLC (PC5)"). The relay UE 210 has corresponding layers used to communicate with the remote UE 205 (e.g., using PC5). In certain embodiments, the remote UE 205 and relay UE 210 have an optional adaptation layer 258. The adaptation layer 258 enables the remote UE 205 to communicate with the mobile network (e.g., eNB 215 and core network 220) via the relay UE 210. Here, the eNB 215 and relay UE 210 use information included in the adaptation layer 258 to identify radio bearers of the remote UE 205 and to determine how such radio bearers are mapped to the relay UE 210's DRBs over the Uu radio interface. The remote UE bearers are relayed on PDCP level which means that the remote UE bearers are multiplexed within the relay UE bearers. Within a Uu DRB, how the remote UE bearers are multiplexed on relay UE are indicated by additional information included below the PDCP layer within an "adaptation layer header" which is added to PDCP PDU.

The remote UE is identified in the adaptation layer header on Uu by only local identifier (i.e. an index), which is known to the eNB and the relay UE. For identifying bearer of the remote UE, a bearer identity is indicated by additional information included in adaptation layer header.

Hence the Adaptation Layer information available at the eNB is shown in the following table:

TABLE 1

| UE | Adaptation Layer Index | DRB ID relay UE | DRB ID remote UE |
|---|---|---|---|
| relay UE | n/a | X | n/a |
| relay UE | n/a | Y | n/a |
| remote UE 1 | 1 | X | Z |
| remote UE 2 | 2 | X | P |
| remote UE 3 | 3 | Y | K |

The remote UE 205 has a Uu PDCP layer 260 and a Uu RRC layer 262. The eNB 215 has corresponding Uu PDCP and Uu RRC layers 260, 262 that establish a RRC connection between the remote UE 205 and the eNB 215. Note that the remote UE 205 and the relay UE 210 have separate RRC connections with the eNB 215. Additionally, the relay UE 210 and eNB 215 each have a Uu physical layer 266 (depicted "PHY (Uu)"), a Uu MAC layer 268 (depicted as "MAC (Uu)"), and a Uu RLC layer 270 (depicted as "RLC (Uu)"), and an adaptation layer 272. The relay UE 210 translates the PC5 layers to Uu layers and vice versa to relay communication between the remote UE 205 and the eNB 215.

The eNB 215 has a S1-MME connection to the core network 220. The eNB 215 has a L1/L2 layer 274, an IP layer 276, a stream control transmission protocol ("SCTP") layer 278, and a S1 Access Protocol ("S1-AP") layer 280. Corresponding layers at the core network 220 terminate L1/L2, IP, SCTP, and S1-AP connections.

In addition, the remote UE 205 and core network 220 each have a NAS layer 264 that establishes a NAS connection between the remote UE 205 and core network 220. As depicted, the remote UE 205 has an RRC connection with the eNB 215 and a NAS connection with the first core network. Note that both connections go through the relay UE 210, which operates as a layer-2 ("L2") relay. As such, the relay UE 210 relays PDCP packet data units (PDUs) between the remote UE 205 and the eNB 215. Note that the relay UE 210 has a separate NAS connection.

Figure 3:
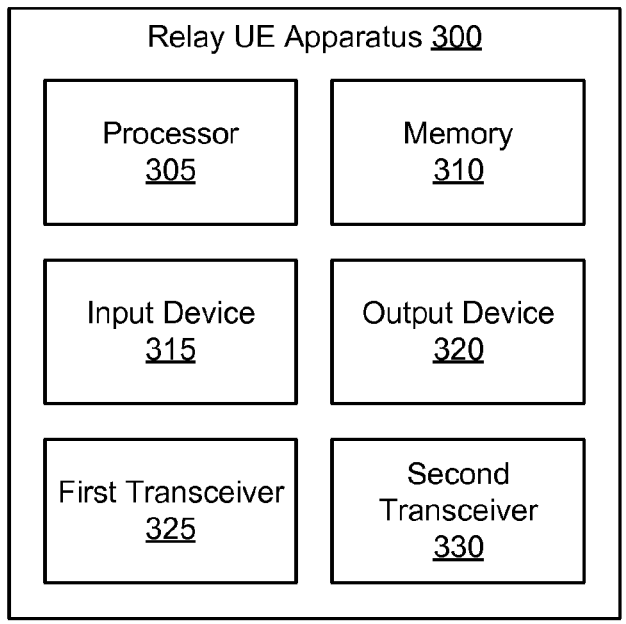
FIG. 3 is a schematic block diagram illustrating one embodiment of a remote apparatus for paging a remote UE that has a direct mobile connection to a relay UE.

FIG. 3 depicts one embodiment of a remote apparatus 300 that may be used for paging a remote UE that has a direct mobile connection to a relay UE, according to embodiments of the disclosure. The remote apparatus 300 may be one embodiment of the remote unit 105, the relay unit 120, the remote UE 205, and/or the relay UE 210. Furthermore, the remote apparatus 300 includes a processor 305, a memory 310, an input device 315, a display 320, a first transceiver 325, and a second transceiver 330.

The first transceiver 325 communicates with a mobile communication network (e.g., a core network) over an access network (e.g., the base unit 110 and/or eNB 215). The second transceiver 330 communicates with one or more remote UEs using a direct mobile connection (e.g., a D2D connection). While depicted as separate transceivers, in certain embodiments the first transceiver 325 and the second transceiver 330 may be the same transceiver, for example where LTE-direct is used to create the direct mobile connection.

Each of the first transceiver 325 and second transceiver 330 may include at least one transmitter and at least one receiver. Additionally, the transceivers may support at least one network interface. For example, the first transceiver 325 may support Uu" interface used to communicate with a base unit or eNB, while the second transceiver 330 may support a "PC5" interface used to communicate with a relay UE. In some embodiments, the input device 315 and the display 320 are combined into a single device, such as a touchscreen. In certain embodiments, the remote unit 105 may not include any input device 315 and/or display 320.

The processor 305, in one embodiment, may include any known controller capable of executing computer-readable instructions and/or capable of performing logical operations. For example, the processor 305 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 305 executes instructions stored in the memory 310 to perform the methods and routines described herein. The processor 305 is communicatively coupled to the memory 310, the input device 315, the display 320, and the transceiver 325.

In some embodiments, the processor 305 transmits a multicast address to a remote UE via the direct mobile connection. Here, transmitting the multicast address to the remote UE may include the processor 305 configuring the remote UE with the multicast address. In one embodiment, the direct mobile connection is a D2D, V2V, V2X, and/or sidelink connection to the remote UE. In certain embodiments, the direct mobile connection uses a PC5 interface. In some embodiments, the multicast address is a multicast Group internet protocol ("IP") address. In other embodiments, the multicast address is a layer 2 group identifier. Here, the relay UE apparatus 300 acts as a layer 2 relay for the remote UE. Note that a remote UE with a direct mobile connection to a relay UE (e.g., to the relay UE apparatus 300) has an indirect connection to the mobile network via the relay UE.

The processor 305 determines to page the remote UE based on signaling from the mobile network. In some embodiments, the processor 305 receives a NAS message from the mobile network and determines to page the remote UE based on the NAS message. For example, the NAS message may be a NAS Downlink Transport message containing a paging message for the remote UE. In other embodiments, the signaling from the mobile network is a paging message that includes a cause value identifying the remote UE. The signaling from the mobile network is discussed in greater detail with reference to FIGS. 5A, 5B, and 6.

The processor 305 transmits a paging message for the remote UE to the multicast address (e.g., multicast over the direct mobile connection). In certain embodiments, transmitting the paging message for the remote UE to the multicast address may include the processor 305 controlling the second transceiver 330 to send the paging message using a PC5 signaling message. Here, the PC5 signaling message has the multicast address as a destination layer 2 identification.

In certain embodiments, the relay UE apparatus 300 may be in an idle mode when the MME-remote 225 receives a trigger to page the remote UE. Here, the mobile network first pages the relay UE apparatus 300 to establish a NAS connection with the MME in order to receive the paging message of the remote UE in the downlink NAS message. In such embodiments, the processor 305 receives a separate paging message that indicates to establish a NAS connection with the mobile network in order to receive a paging of the remote UE and the processor 305 receives the NAS Downlink Transport message in response to the separate paging message.

In one embodiment, the processor 305 receives an indication to page the remote UE via the direct mobile connection and transmits a message containing the indication to the mobile network. For example, when the remote UE establishes the direct mobile connection, it may indicate a preference to be paged via the direct mobile connection. Here, the processor 305 may receive the indication during the Initial Attach procedure or during a Service Request procedure. The mobile network uses this indication as an input when determining how to send a paging message to the remote UE.

The memory 310, in one embodiment, is a computer readable storage medium. In some embodiments, the memory 310 includes volatile computer storage media. For example, the memory 310 may include a RAM, including dynamic RAM ("DRAM"), synchronous dynamic RAM ("SDRAM"), and/or static RAM ("SRAM"). In some embodiments, the memory 310 includes non-volatile computer storage media. For example, the memory 310 may include a hard disk drive, a flash memory, or any other suitable non-volatile computer storage device. In some embodiments, the memory 310 includes both volatile and non-volatile computer storage media. In some embodiments, the memory 310 stores data relating to paging a remote UE that has a direct mobile connection to a relay UE, for example storing local identifiers, a multicast address for paging remote UEs, protocol stacks, messages, and the like. In some embodiments, the memory 310 also stores program code and related data, such as an operating system or other controller algorithms operating on the remote unit 105 and one or more software applications.

The input device 315, in one embodiment, may include any known computer input device including a touch panel, a button, a keyboard, a stylus, a microphone, or the like. In some embodiments, the input device 315 may be integrated with the display 320, for example, as a touchscreen or similar touch-sensitive display. In some embodiments, the input device 315 includes a touchscreen such that text may be input using a virtual keyboard displayed on the touchscreen and/or by handwriting on the touchscreen. In some embodiments, the input device 315 includes two or more different devices, such as a keyboard and a touch panel.

The display 320, in one embodiment, may include any known electronically controllable display or display device. The display 320 may be designed to output visual, audible, and/or haptic signals. In some embodiments, the display 320 includes an electronic display capable of outputting visual data to a user. For example, the display 320 may include, but is not limited to, an LCD display, an LED display, an OLED display, a projector, or similar display device capable of outputting images, text, or the like to a user. As another, non-limiting, example, the display 320 may include a wearable display such as a smart watch, smart glasses, a heads-up display, or the like. Further, the display 320 may be a component of a smart phone, a personal digital assistant, a television, a table computer, a notebook (laptop) computer, a personal computer, a vehicle dashboard, or the like.

In certain embodiments, the display 320 includes one or more speakers for producing sound. For example, the display 320 may produce an audible alert or notification (e.g., a beep or chime). In some embodiments, the display 320 includes one or more haptic devices for producing vibrations, motion, or other haptic feedback. In some embodiments, all or portions of the display 320 may be integrated with the input device 315. For example, the input device 315 and display 320 may form a touchscreen or similar touch-sensitive display. In other embodiments, the display 320 may be located near the input device 315.

The transceiver 325, 330 operate under the control of the processor 305 to transmit messages, data, and other signals and also to receive messages, data, and other signals. For example, the processor 305 may selectively activate the transceivers 325, 330 (or portions thereof) at particular times in order to send and receive messages. As discussed above, the transceivers 325, 330 may support one or more the network interfaces for communicating with the mobile communication network and/or remote UEs.

Figure 4:
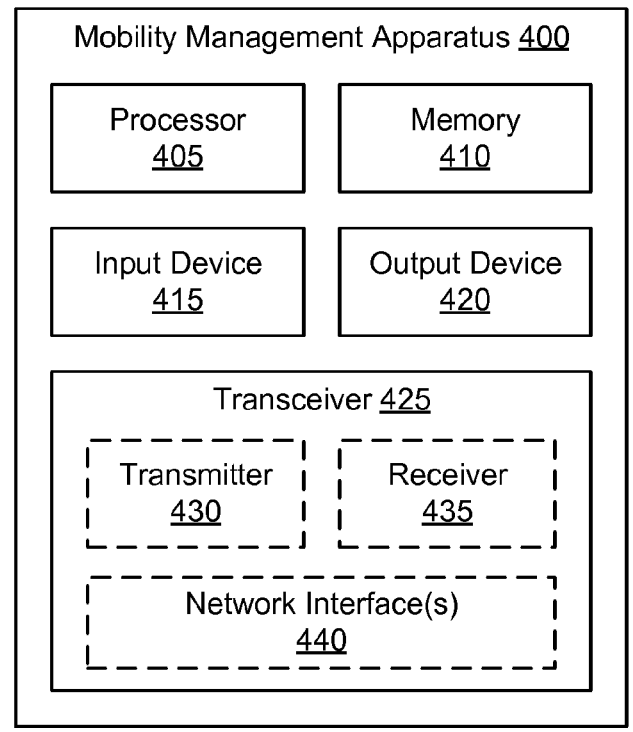
FIG. 4 is a schematic block diagram illustrating one embodiment of a mobility management apparatus for paging a remote UE that has a direct mobile connection to a relay UE.

FIG. 4 depicts one embodiment of a mobility management apparatus 400 that may be used for paging a remote UE that has a direct mobile connection to a relay UE, according to embodiments of the disclosure. The mobility management apparatus 400 may be one embodiment of the MME 135, the MME-remote 225, and/or the MME-relay 230. Furthermore, the mobility management apparatus 400 includes a processor 405, a memory 410, an input device 415, a display 420, and a transceiver 425. In some embodiments, the input device 415 and the display 420 are combined into a single device, such as a touchscreen. In other embodiments, the mobility management apparatus 400 may not include any input device 415 and/or display 420.

As depicted, the transceiver 425 includes at least one transmitter 430 and at least one receiver 435. Additionally, the transceiver 425 may support at least one network interface 440 such as an "S10" interface used to communicate with another mobility management apparatus in the mobile network. Additionally, the at least one network interface 440 may include an "S1-MME" interface used to communicate with an eNB.

The processor 405, in one embodiment, may include any known controller capable of executing computer-readable instructions and/or capable of performing logical operations. For example, the processor 405 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 405 executes instructions stored in the memory 410 to perform the methods and routines described herein. The processor 405 is communicatively coupled to the memory 410, the input device 415, the display 420, and the transceiver 425.

In some embodiments, the mobility management apparatus 400 serves a remote UE, such as the remote unit 105 and/or remote UE 205. In such embodiments, the processor 405 may receive a trigger to page the remote UE. In response, the processor 405 may identify a relay UE that serves the remote UE and a network communication node (e.g., an MME) serving the relay UE, wherein the remote UE accesses the mobile network via sidelink communication with the relay UE. In some embodiments, the processor 405 identifies the network communication node (e.g., MME) serving the relay UE by querying a subscriber database in the mobile network, such as a UDM.

Here it is assumed that the mobility management apparatus 400 is already aware that the remote UE has an indirect connection to the mobile network via the relay UE (a layer 2 relay). For example, the processor 405 may receive a message from the remote UE upon the remote UE establishing the sidelink communication (e.g., D2D connection) with the relay UE. In certain embodiments, such a message may also include an indication that the remote UE is to be paged via the relay UE (e.g., via sidelink communication).

In response to identifying the relay UE, the processor 405 sends a paging message to the network communication node (MME) serving the relay UE. Here, the paging message contains a page for the remote UE (the remote UE being separate than the relay UE). In certain embodiments, the processor 405 sends the paging message for the remote UE to the network communication node serving the relay UE by controlling the transceiver to send the paging message over an S10 network interface. In one embodiment, the paging message includes an identity of the relay UE and an identify of the remote UE.

In some embodiments, the mobility management apparatus 400 serves a relay UE, such as the relay unit 120 and/or relay UE 210. In such embodiments, the processor 405 may receive a paging message for a remote UE even though the mobility management apparatus 400 does not serve the remote UE. Here, the paging message may be received from a MME, or other mobility management node, that serves the remote UE. For example, the paging message may be received over an S10 network interface.

In response to receiving the paging message, the processor 405 may identify a relay UE that serves the remote UE, wherein the remote UE accesses the mobile network via sidelink communication with the relay UE. Here it is assumed that the mobility management apparatus 400 is already aware that the remote UE has an indirect connection to the mobile network via the relay UE (a layer 2 relay). For example, the processor 405 may receive a message from the relay UE upon the remote UE establishing the sidelink communication (e.g., D2D connection) with the relay UE. In response to identifying the relay UE that serves the remote UE, the processor 405 sends the paging message for the remote UE to the relay UE.

In certain embodiments, the received paging message includes an identity of the remote UE and an indication that the remote UE is to be paged over a sidelink channel. In some embodiments, sending the paging message includes the processor 405 controlling the transceiver to send a NAS message that includes the paging message of the remote UE to the relay UE. In other embodiments, sending the paging message comprises the processor 405 controlling the transceiver to send the paging message for the remote UE during a paging occasion of the relay UE. Here, the paging message transmitted during the paging occasion may include a cause value that contains an identity of the remote UE.

In certain embodiments, the processor 405 determines that the relay UE is in an idle state. In such embodiments, the processor 405 may control the transceiver to transmit a separate paging message to the relay UE in response to the relay UE being in the idle state. Further, the processor 405 may send the NAS message upon the relay UE responding to the separate paging message.

The memory 410, in one embodiment, is a computer readable storage medium. In some embodiments, the memory 410 includes volatile computer storage media. For example, the memory 410 may include a RAM, including dynamic RAM ("DRAM"), synchronous dynamic RAM ("SDRAM"), and/or static RAM ("SRAM"). In some embodiments, the memory 410 includes non-volatile computer storage media. For example, the memory 410 may include a hard disk drive, a flash memory, or any other suitable non-volatile computer storage device. In some embodiments, the memory 410 includes both volatile and non-volatile computer storage media. In some embodiments, the memory 410 stores data relating to paging a remote UE that has a direct mobile connection to a relay UE, for example storing associations of relay UEs to remote UEs, UE identities, and the like. In certain embodiments, the memory 410 also stores program code and related data, such as an operating system or other controller algorithms operating on the mobility management apparatus 400 and one or more software applications.

The input device 415, in one embodiment, may include any known computer input device including a touch panel, a button, a keyboard, a stylus, a microphone, or the like. In some embodiments, the input device 415 may be integrated with the display 420, for example, as a touchscreen or similar touch-sensitive display. In some embodiments, the input device 415 includes a touchscreen such that text may be input using a virtual keyboard displayed on the touchscreen and/or by handwriting on the touchscreen. In some embodiments, the input device 415 includes two or more different devices, such as a keyboard and a touch panel.

The display 420, in one embodiment, may include any known electronically controllable display or display device. The display 420 may be designed to output visual, audible, and/or haptic signals. In some embodiments, the display 420 includes an electronic display capable of outputting visual data to a user. For example, the display 420 may include, but is not limited to, an LCD display, an LED display, an OLED display, a projector, or similar display device capable of outputting images, text, or the like to a user. As another, non-limiting, example, the display 420 may include a wearable display such as a smart watch, smart glasses, a heads-up display, or the like. Further, the display 420 may be a component of a smart phone, a personal digital assistant, a television, a table computer, a notebook (laptop) computer, a personal computer, a vehicle dashboard, or the like.

In certain embodiments, the display 420 includes one or more speakers for producing sound. For example, the display 420 may produce an audible alert or notification (e.g., a beep or chime). In some embodiments, the display 420 includes one or more haptic devices for producing vibrations, motion, or other haptic feedback. In some embodiments, all or portions of the display 420 may be integrated with the input device 415. For example, the input device 415 and display 420 may form a touchscreen or similar touch-sensitive display. In other embodiments, the display 420 may be located near the input device 415.

The transceiver 425 facilitates communication with one or more eNBs and with one or more network functions of a mobile communication network. The transceiver 425 operates under the control of the processor 405 to transmit messages, data, and other signals and also to receive messages, data, and other signals. For example, the processor 405 may selectively activate the transceiver (or portions thereof) at particular times in order to send and receive messages. The transceiver 425 may include one or more transmitters 430 and one or more receivers 435. As discussed above, the transceiver 425 may support one or more the network interface 440 for communicating with one or more eNBs and with one or more network functions in a mobile communication network.

Figure 5A:
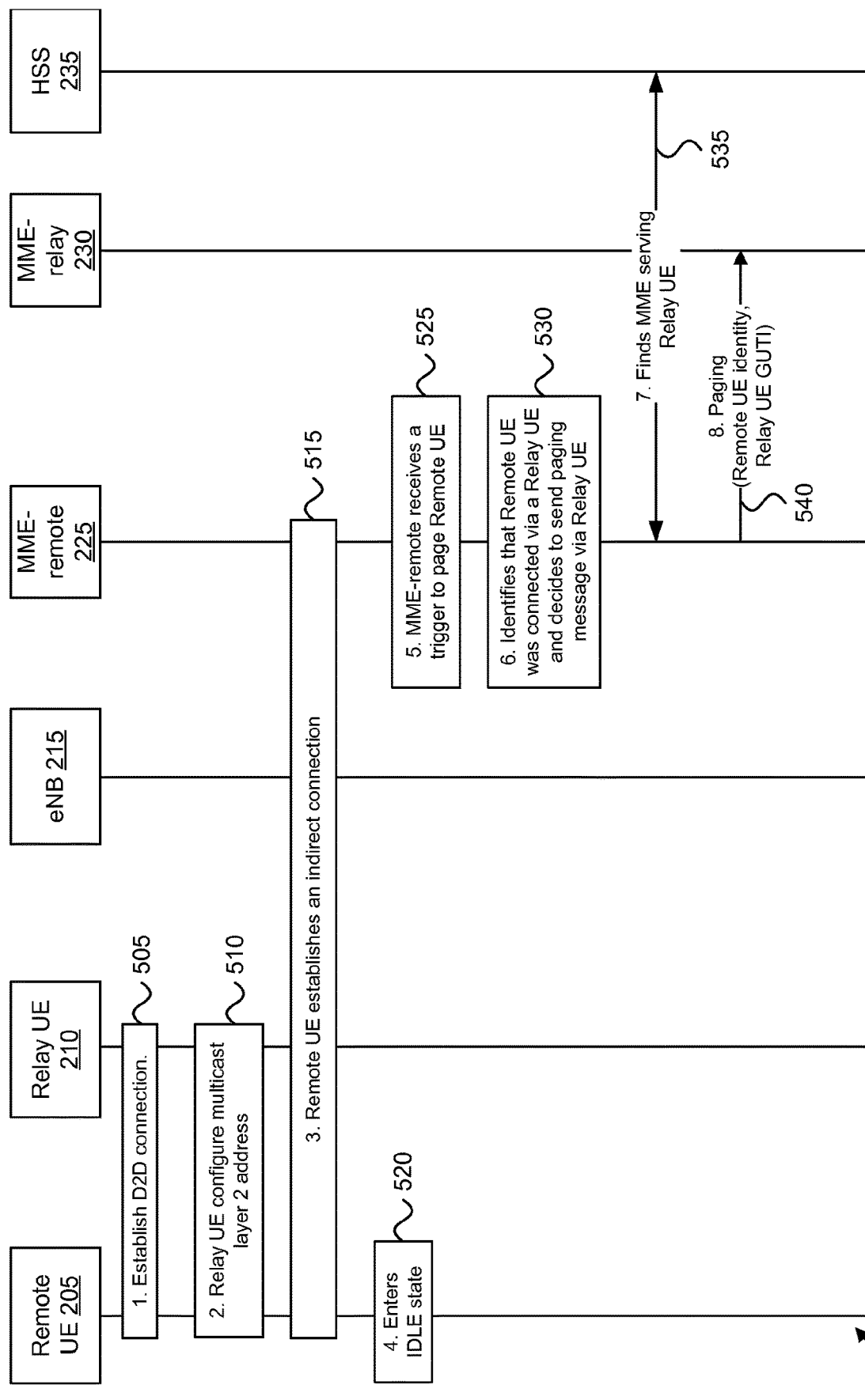
FIG. 5A is a block diagram illustrating one embodiment of a network procedure for paging a remote UE that has a direct mobile connection to a relay UE.
Figure 5B:
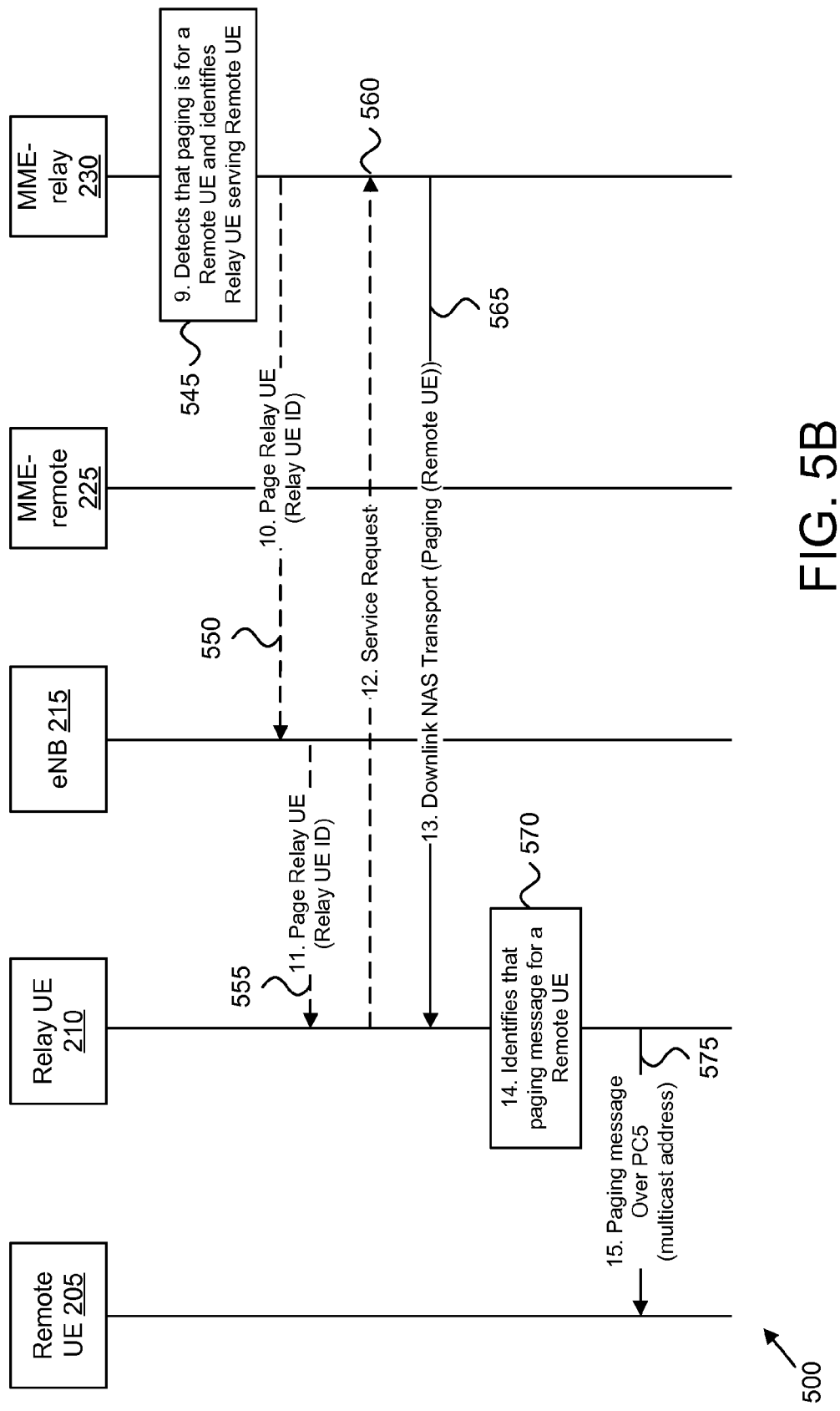
FIG. 5B is a block diagram illustrating a continuation of the network procedure of FIG. 5A.

FIGS. 5A and 5B depict a network procedure 500 for paging a remote UE that has a direct mobile connection to a relay UE, according to embodiments of the disclosure. The network procedure 500 involves the remote UE 205, the relay UE 210, the eNB 215, the MME-remote 225, the MME-relay 230, and the HSS 235. The network procedure 500 addresses a scenario where the paging message of the remote UE 205 is sent within dedicated NAS signaling towards the relay UE 210. In order to shield the permanent identity of the remote UE 205 from the relay UE 210, the relay UE 210 multicasts the paging message to all the remote UEs connected to the relay UE 210. To support such multicast paging, the relay 210 configures a multicast address over PC5 when a remote UE establishes a D2D connection with the relay UE 210. In certain embodiments, the same multicast address is used for all remote UEs establishing a D2D connection with the relay UE 210. The remote UE 205 (and any other connected remote UE) will monitor the multicast address for paging messages.

In the embodiments of FIGS. 5A-5B it is assumed that the MME-remote 225 is aware that the remote UE 205 connects to the network via the relay UE 210 and is also aware of the identity of the relay UE 210. For example, the eNB 215 may add an identifier of the relay UE 210, such as the international mobile subscriber identity ("IMSI") or globally unique temporary identifier ("GUTI"), in the S1-AP message towards the MME-remote 225 when the remote UE 205 establishes an indirect connection with the mobile network, as discussed below.

The network procedure 500 begins at FIG. 5A with the remote UE 205 discovering the relay UE 210 and establishing a D2D connection (see block 505). For example, the D2D connection may be established using LTE-direct, WiFi-direct, or the like. While only one remote UE 205 is shown, more than one remote UEs may establish a D2D connection with the same relay UE 210.

In response to establishing the D2D connection, the relay UE 210 configures a multicast address for all UEs establishing a D2D connection (see block 510). This multicast address may be an IP address or a group identifier. In some embodiments, the relay UE 210 selects the multicast address. In other embodiments, the multicast address may be provisioned by the proximity service ("ProSe") Function (not shown).

The remote UE 205 establishes an indirect connection with the mobile network via the relay UE 210 (see block 515). At this point the MME-remote 225 becomes aware that its connection to the remote UE 205 is relayed via the relay UE 210. In certain embodiments, the MME-remote 225 learns the identity of the MME serving the relay UE (e.g., the MME-relay 230). In some embodiments, the remote UE 205 may include an indication in the NAS message towards the MME-remote 225 that it wishes to receive paging messages while connected to the relay UE 210.

At some point in time, the remote UE 205 enters an IDLE state and releases the indirect connection to the mobile network (see block 520). Note that the remote UE 205 is still maintaining a D2D connection with the relay UE 210. At this point the remote UE 205 may indicate to the relay UE 210 (e.g., via PC5 signaling) that it wishes to receive paging messages through the direct mobile connection (e.g., D2D/PC5) to the relay UE 210. In certain embodiments, if no remote UE provides an indication to be paged over the direct mobile connection, then the relay UE 210 does not multicast paging messages to the connected remote UEs.

At some later point in time, the MME-remote 225 receives a trigger to page the remote UE 205 (see block 525). The MME-remote 225 identifies that the remote UE 205 was connected via the relay UE 210 and decides, e.g., based on local policy, to page the remote UE 205 via the relay UE 210 (see block 530). Here, the previously received indication that the remote UE 205 wishes to receive paging messages will connect to the relay UE 210 may be a factor considered by the MME-remote 225 when deciding to page the remote UE 205 via the relay UE 210.

The MME-remote 225 checks with the HSS 235 to find the MME currently serving the relay UE 210 (see messaging 535). In the embodiments of FIGS. 5A-5B, the MME currently serving the relay UE 210 is the MME-relay 230. Although in certain embodiments the MME-remote 225 was previously aware of the identity of the MME serving the relay UE 210, the MME-remote 225 checks with HSS 235 in case, for example, the relay UE 210 handovers and the MME is relocated.

Having identified that the MME-relay 230 is the MME currently serving the relay UE 210, the MME-remote 225 sends a paging message to the MME-relay 230 (see messaging 540). Here, the paging message may be sent via the S10 reference point towards the MME-relay 230. The paging message includes the identity of the remote UE 205 and the identity of the relay UE 210 (e.g., the GUTI of the relay UE 210).

The network procedure 500 continues at FIG. 5B with the MME-relay 230 determining that the received paging message is for the remote UE 205 and identifying the relay UE 210 serving the remote UE 205 (see block 545). Here, the MME-relay 230 identifies that the paging message is for a UE it does not serve (i.e., the remote UE 205) and that has a direct mobile connection with a relay UE it does serve (i.e., with the relay UE 210). Accordingly, the MME-relay 230 determines to send the paging message within dedicated NAS signaling towards the relay UE 210.

In some embodiments, the MME-relay 230 determines that the relay UE 210 is an IDLE state and so MME-relay 230 pages the relay UE 210 using a separate S1-AP paging message (see messaging 550). Here, the separate paging message may include a cause value that indicates to the relay UE 210 that the page is due to paging required for a remote UE served by the relay UE 210. The MME-relay 230 sends the separate paging message to the tracking area the relay UE 210 is located, and the eNB 215 broadcasts the separate paging message to the relay UE 210 (see messaging 555).

The relay UE 210 received paging message, enters a CONNECTED state, and establishes a service request (e.g., over a NAS connection) towards the MME-relay 230 (see messaging 560). In some embodiments, the Service Request NAS message may include an indication (e.g., cause value)

indicating that the Service Request message was sent due to a paging of a remote UE 205.

The MME-relay 230 sends the paging message for the remote UE 205 within dedicated NAS signaling towards the relay UE 210 (see messaging 565). As depicted, the paging message may be sent within a NAS Downlink Transport message. In one embodiment, the NAS Downlink Transport message is sent in response to the relay UE 210 responding to the separate paging message. In other embodiments, the relay UE 210 is not an IDLE mode and therefore the separate paging is not needed before the MME-relay 230 sends the NAS Downlink Transport message.

Upon receiving the NAS message signaling containing the paging message, the relay UE 210 detects that the paging message is intended for a remote UE (see block 570). In one embodiment, the received paging message includes an indication that the paging message is intended for a Remote UE 205. The relay UE 210 multicasts the paging message via PC5 signaling to the remote UE 205 (see messaging 575). Note that the paging messages multicast to all remote UE is connected to the relay UE 210 using the configured multicast address. Here, the relay UE 210 may set the destination layer 2 ID of the PC5 message to the multicast address previously configured. The remote UE 205 monitors the PC5 signaling and detect the paging message based on the UE identity. The network procedure 500 ends.

Beneficially, in the network procedure 500 the relay UE 210 does not need to monitor paging occasions belonging to the remote UE 205 while the remote UE 205 is an idle state. Additionally, the network procedure 500 does not require the relay UE 210 to know the IMSI or other permanent identity of the remote UE 205, nor does the relay UE 210 need to know the DRX cycles of the remote UE 205 (recall that the IMSI and the DRX cycles are needed to calculate the paging occasions of the remote UE 205).

Figure 6:
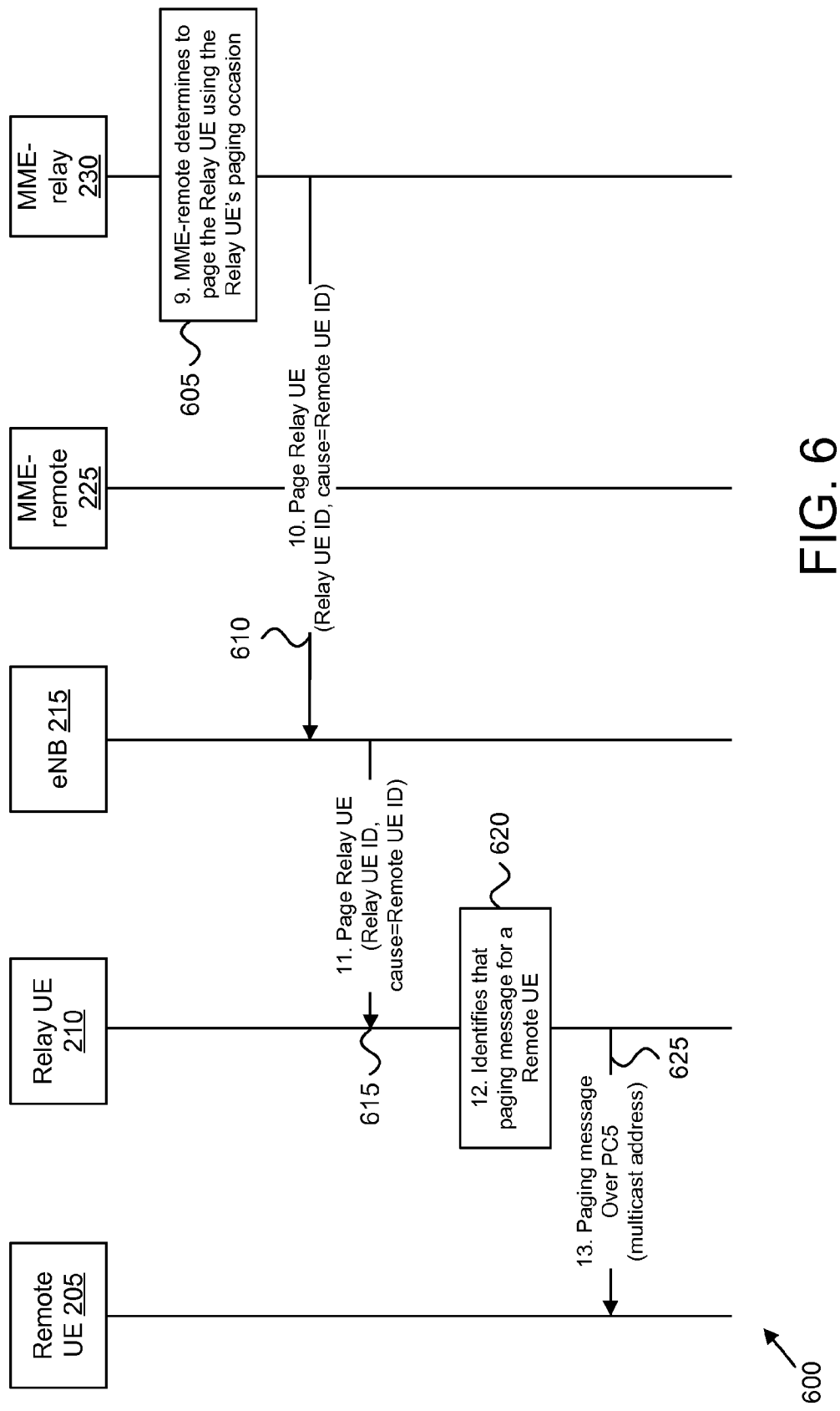
FIG. 6 is a block diagram illustrating an alternate continuation of the network procedure of FIG. 5A.

FIG. 6 depicts another network procedure 600 for paging a remote UE that has a direct mobile connection to a relay UE, according to embodiments of the disclosure. The network procedure 600 involves the remote UE 205, the relay UE 210, the eNB 215, the MME-remote 225, the MME-relay 230, and the HSS 235. The network procedure 600 is an alternative procedure to the portion of the network procedure 500 shown at FIG. 5B. The network procedure 600 addresses a scenario where the MME-relay 230 includes an indication in the paging message of the relay UE 210 that a remote UE 205 connected to the relay UE 210 required to be paged.

In this scenario, the remote UE 205 and relay UE 210 establish a D2D connection and the relay UE 210 configures a multicast layer to address for paging remote UE 205, as described above with reference to FIG. 5A. Additionally, the remote UE 205 establishes an indirect connection and later enters into an idle state, releasing the indirect connection, also is described above with reference to FIG. 5A. Further, the MME-remote 225 receives a trigger to page the remote UE 205 and identifies the remote UE 205 is connected to the relay UE 210 the MME-remote 225. As discussed above with reference to FIG. 5A, the MME-remote 225 identifies the MME serving the relay UE 210 (e.g., identifies that the MME-relay 230 serves the relay UE 210) and sends a paging message including an indication that the paging is intended for the remote UE 205. In certain embodiments, the paging message includes the identity of the remote UE 205 and relay UE 210.

The network procedure 600 continues from the end of FIG. 5A with the MME-relay 230 determining to page the relay UE 210 using the relay UE's paging occasions (see block 605). The MME-relay 230 sends towards the relay UE 210 a S1-AP paging message includes an indication that the page is for a remote UE (see messaging 610). As depicted, this paging message may include a cause value cause value containing the identity of the remote UE.

The relay UE 210, monitoring its own paging occasions, receives the paging message broadcast by the eNB 215 (see messaging 615). Additionally, the relay UE 210 identifies that the paging is intended for the remote UE 205 (see block 620). The relay UE 210 then multicasts the paging message to the remote UE 205 using the previously configured multicast address. As discussed above, the relay UE 210 may set the destination layer 2 ID of the PC5 message to the multicast address. The remote UE 205 monitors the PC5 signaling and detect the paging message based on the UE identity. The network procedure 600 ends.

Figure 7:
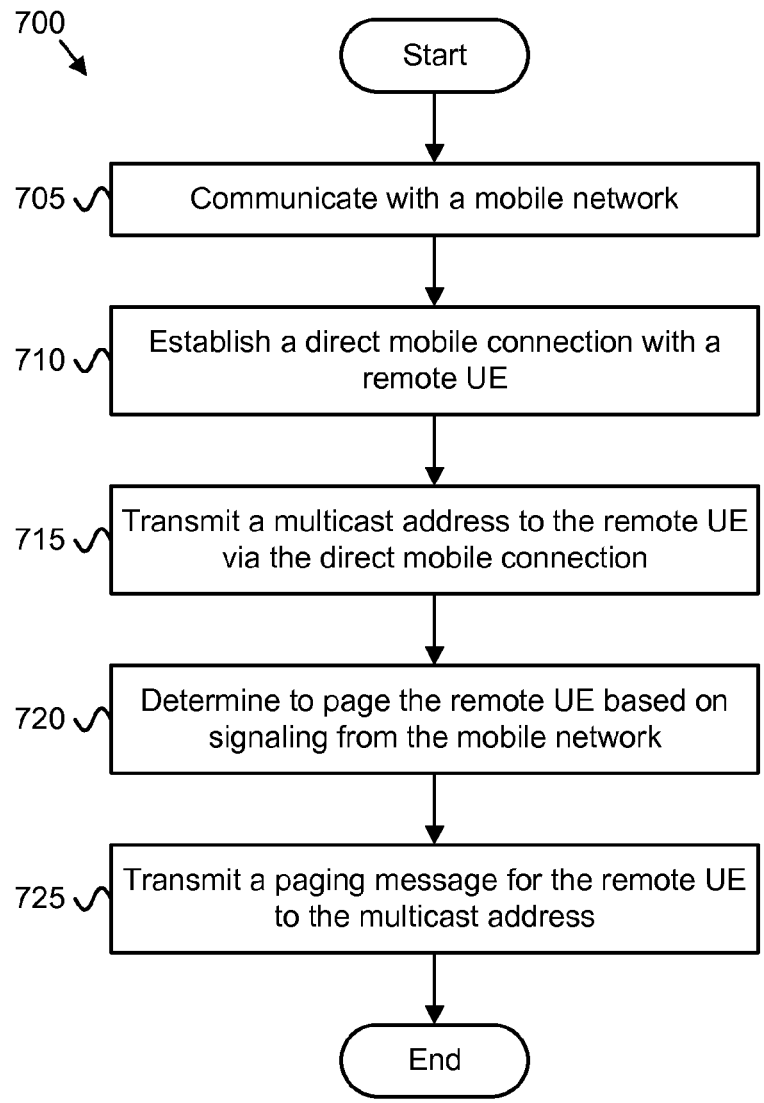
FIG. 7 is a schematic flow chart diagram illustrating one embodiment of a method of a relay UE for paging a remote UE that has a direct mobile connection to the relay UE.

FIG. 7 depicts a method 700 for paging a remote UE that has a direct mobile connection to a relay UE, according to embodiments of the disclosure. In some embodiments, the method 700 is performed by a relay unit apparatus, such as the relay unit 120, relay UE 210, and/or relay UE apparatus 300. In certain embodiments, the method 700 may be performed by a processor executing program code, for example, a microcontroller, a microprocessor, a CPU, a GPU, an auxiliary processing unit, a FPGA, or the like.

The method 700 begins with communicating 705 with a mobile network and establishing 710 a direct mobile connection with a remote UE. In certain embodiments, establishing 710 the direct mobile connection with the remote UE includes receiving, from the remote UE, an indication to page the remote UE via the direct mobile connection and transmitting, to the mobile network, a message containing the indication. For example, the remote UE may indicate a preference to be paged via the direct mobile connection when it establishes the direct mobile connection. The mobile network uses this indication as an input when determining how to send a paging message to the remote UE The method 700 includes transmitting 715 a multicast address to the remote UE via the direct mobile connection. In some embodiments, transmitting 715 the multicast address to the remote UE comprises configuring the remote UE with the multicast address. In one embodiment, the multicast address is a multicast Group internet protocol ("IP") address. In another embodiment, the multicast address is a layer 2 group identifier.

The method 700 includes determining 720 to page the remote UE based on signaling from the mobile network. In some embodiments, the signaling from the mobile network is a NAS message, such as a NAS Downlink Transport message, received from the mobile network. Here, determining to page the remote UE based on signaling from the mobile network comprises determining to page the remote UE based on the NAS message. For example, a NAS Downlink Transport message may include a paging message for the remote UE.

In a further embodiment, determining 720 to page the remote UE based on signaling from the mobile network includes receiving a separate paging message to establish a NAS connection with the mobile network and receiving the NAS Downlink Transport message after establishing the NAS connection in response to the separate paging message. For example, a relay UE receiving the signaling from the mobile network may initially be in an idle state, wherein the mobile network sends the separate page to wake the relay UE thereby causing the relay UE to establish a NAS connection with the mobile network and receive the NAS Downlink Transport message.

In certain embodiments, the signaling from the mobile network comprises a paging message received at the relay UE, wherein said paging message includes a cause value that identifies the remote UE. Accordingly, determining 720 to page the remote UE based on signaling from the mobile network may include determining to page the remote UE in response to the paging message including a cause value that identifies the remote UE.

The method 700 includes transmitting 725 a paging message for the remote UE to the multicast address. In some embodiments, transmitting 725 the paging message for the remote UE to the multicast address comprises sending the paging message using a PC5 signaling message having the multicast address as a destination layer 2 identification. The method 700 ends.

Figure 8:
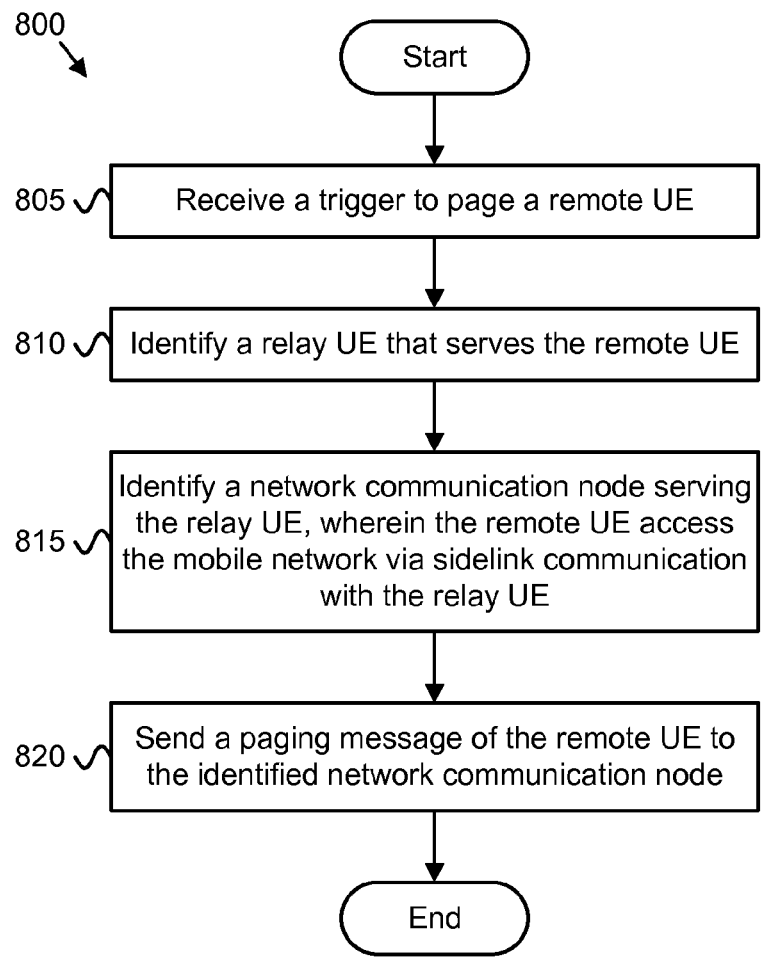
FIG. 8 is a schematic flow chart diagram illustrating one embodiment of a method of a mobility management entity for paging a remote UE that has a direct mobile connection to a relay UE.

FIG. 8 depicts a method 800 for paging a remote UE that has a direct mobile connection to a relay UE, according to embodiments of the disclosure. In some embodiments, the method 800 is performed by a network communication apparatus, such as the MME 135, MME-remote 225, and/or the mobility management apparatus 400. In certain embodiments, the method 800 may be performed by a processor executing program code, for example, a microcontroller, a microprocessor, a CPU, a GPU, an auxiliary processing unit, a FPGA, or the like.

The method 800 begins and receives 805 a trigger to page a remote UE. The method 800 includes identifying 810 a relay UE that serves the remote UE. In certain embodiments, the method includes receiving an indication that the remote UE is to be paged via sidelink communication (e.g., that the remote UE is reachable for paging via the relay UE), wherein identifying 810 the relay UE that serves the remote UE occurs in response to receiving the indication. In one embodiment, the indication is received when the remote UE initially establishes a D2D/PC5 connection with the relay UE.

The method 800 includes identifying 815 a network communication node (e.g., a MME) serving the relay UE, wherein the remote UE accesses the mobile network via sidelink communication with the relay UE. In certain embodiments, identifying 815 the network communication node serving the relay UE comprises querying a subscriber database in the mobile network.

The method 800 includes sending 820 a paging message to the network communication node serving the relay UE, the paging message comprising a page for the remote UE. In some embodiments, sending 820 the paging message for the remote UE to the network communication node serving the relay UE comprises sending the paging message over an S10 network interface. In certain embodiments, the paging message includes an identity of the relay UE and an identify of the remote UE. The method 800 ends.

Figure 9:
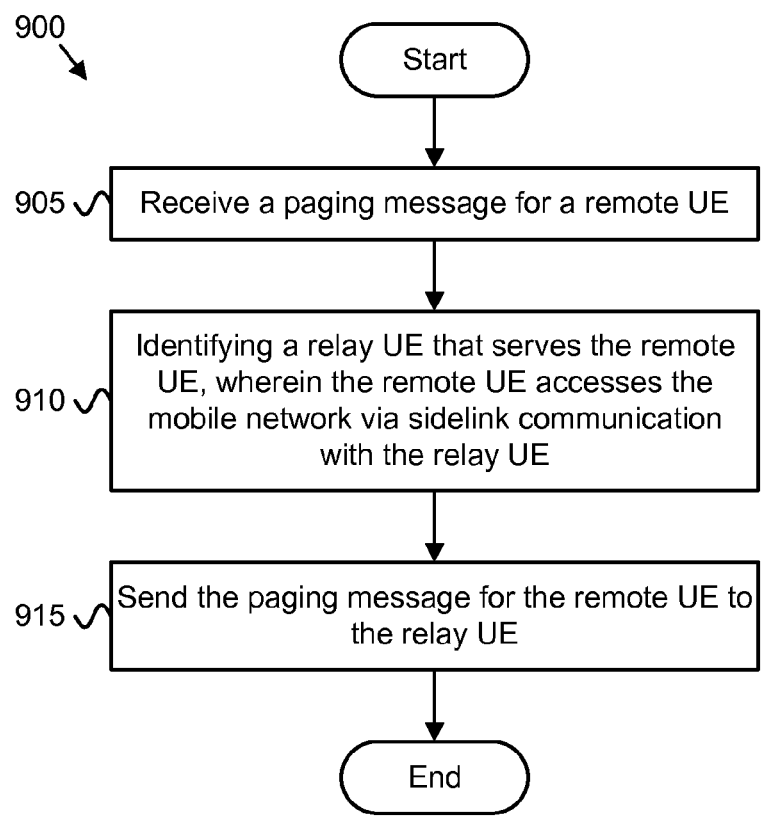
FIG. 9 is a schematic flow chart diagram illustrating another embodiment of a method of a mobility management entity for paging a remote UE that has a direct mobile connection to a relay UE.

FIG. 9 depicts a method 900 for paging a remote UE that has a direct mobile connection to a relay UE, according to embodiments of the disclosure. In some embodiments, the method 900 is performed by a network communication apparatus, such as the MME 135, the MME-relay 230, and/or mobility management apparatus 400. In certain embodiments, the method 900 may be performed by a processor executing program code, for example, a microcontroller, a microprocessor, a CPU, a GPU, an auxiliary processing unit, a FPGA, or the like.

The method 900 begins and receives 905 a paging message for a remote UE. In one embodiment, the paging message is received from a network communication node, such as an MME, that serves the remote UE. In some embodiments, the paging message includes an identity of the remote UE and an indication that the remote UE is to be paged over a sidelink channel.

The method 900 includes identifying 910 a relay UE that serves the remote UE, wherein the remote UE accesses the mobile network via sidelink communication with the relay UE. Here, the step of identifying 910 the relay UE is performed by a network communication node, such as an MME, that serves the relay UE.

The method 900 includes sending 915 the paging message for the remote UE to the relay UE. In some embodiments, sending 915 the paging message includes sending a non-access stratum ("NAS") message that includes the paging message of the remote UE to the relay UE. In certain embodiments, sending 915 the paging message includes determining that the relay UE is in an idle state and transmitting a separate paging message to the relay UE in response to the relay UE being in the idle state, wherein sending 915 the NAS message occurs in response to the relay UE responding to the separate paging message.

In other embodiments, sending 915 the paging message comprises transmitting the paging message for the remote UE during a paging occasion of the relay UE. In such embodiments, the paging message transmitted during the paging occasion nay include includes a cause value that contains an identity of the remote UE. The method 900 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:
    a first transceiver that communicates with a mobility management function in a mobile network;
    a second transceiver that communicates with a remote unit via a direct mobile connection; and
    a processor that:
        transmits a multicast address to the remote unit via the direct mobile connection;
        receives a first paging message from the mobility management function that indicates to establish a non-access stratum ("NAS") connection with the mobile network to receive a paging of the remote unit;
        transmits a service request to the mobility management function to establish a NAS connection;
        receives a NAS Downlink Transport message from the mobility management function via the NAS connection, the NAS Downlink Transport message comprising a second paging message for the remote unit;
        determines to page the remote unit based on the received NAS message from the mobile network using the multicast address without monitoring the paging occasions of the remote unit while the remote unit is in an idle state; and
        transmits the second paging message for the remote unit to the multicast address via the direct mobile connection to the remote unit.

2. The apparatus of claim 1, further comprising the processor receiving a separate paging message that indicates to establish a NAS connection with the mobile network in order to receive a paging of the remote unit, wherein the processor receives a NAS Downlink Transport message comprising a paging message for the remote unit in response to the separate paging message.

3. The apparatus of claim 1, wherein the processor receives an indication to page the remote unit via the direct mobile connection and transmits a message containing the indication to the mobile network.

4. The apparatus of claim 1, wherein the signaling from the mobile network comprises a second paging message, wherein the second paging message includes a cause value that identifies the remote unit.

5. The apparatus of claim 1, wherein transmitting the paging message for the remote unit to the multicast address comprises sending the paging message using a PC5 signaling message having the multicast address as a destination layer 2 identification.

6. An apparatus comprising:
a transceiver that communicates with a mobile network; and
a processor that:
receives a trigger to page a remote unit;
identifies a relay unit that serves the remote unit and a network communication node serving the relay unit, wherein the remote unit accesses the mobile network via sidelink communication with the relay unit; and
sends a paging message to the network communication node serving the relay unit, the paging message comprising a page for the remote unit, an identity of the relay unit serving the remote unit, and an identity of the remote unit that is receiving the page.

7. The apparatus of claim 6, wherein identifying the network communication node serving the relay unit comprises querying a subscriber database in the mobile network.

8. The apparatus of claim 6, wherein the processor further receives an indication that the remote unit is to be paged via sidelink communication, wherein identifying the relay unit that serves the remote unit occurs in response to receiving the indication.

9. An apparatus comprising:
a transceiver that communicates with a mobile network; and
a processor that:
receives a paging message for a remote unit;
identifies a relay unit that serves the remote unit, wherein the remote unit accesses the mobile network via sidelink communication with the relay unit;
determines that the relay unit is in an idle state;
transmits a separate paging message to the relay unit in response to the relay unit being in the idle state; and
sends a non-access stratum ("NAS") message that includes the paging message of the remote unit to the relay unit in response to the relay unit responding to the separate paging message.

10. The apparatus of claim 9, wherein sending the paging message comprises the processor transmitting the paging message for the remote unit during a paging occasion of the relay unit, wherein the paging message transmitted during the paging occasion includes a cause value that contains an identity of the remote unit.

11. A system comprising:
a relay unit that communicates with a mobile network;
a remote unit that accesses the mobile network via a direct mobile connection with the relay unit;
a first network communication node that manages mobility of the remote unit; and
a second network communication node that manages mobility of the relay unit,
wherein the first network communication node sends a paging message for the remote unit to the second network communication node,
wherein the second network communication node sends the paging message to the relay unit, and
wherein the relay unit multicasts the paging message to the remote unit using a preconfigured multicast address without monitoring the paging occasions of the remote unit while the remote unit is in an idle state.

12. The system of claim 11, wherein the second network communication node sends the paging message by sending a non-access stratum ("NAS") message that includes the paging message of the remote unit to the relay unit.

13. The system of claim 11, wherein the second network communication node sends the paging message by transmitting the paging message for the remote unit during a paging occasion of the relay unit.

14. The system of claim 11, wherein the multicast address is one of a multicast group IP address and a layer 2 group identifier, wherein the relay unit configures the remote unit with the multicast address.

15. The system of claim 14, further comprising a proximity service function that sends the multicast address to the relay unit via a PC5 interface.

16. The system of claim 11, wherein the remote unit transmits a message to the first network communication node in response to establishing the direct mobile connection with the relay unit, wherein the message indicates that the remote unit is to be paged via the direct mobile connection.

* * * * *